July 15, 1952 — J. WEISS ET AL — 2,603,731
GOVERNOR FOR THE AUTOMATIC CONTROL OF BRAKES
OF MOTOR VEHICLES OR THE LIKE
Filed Nov. 27, 1948 — 2 SHEETS—SHEET 1
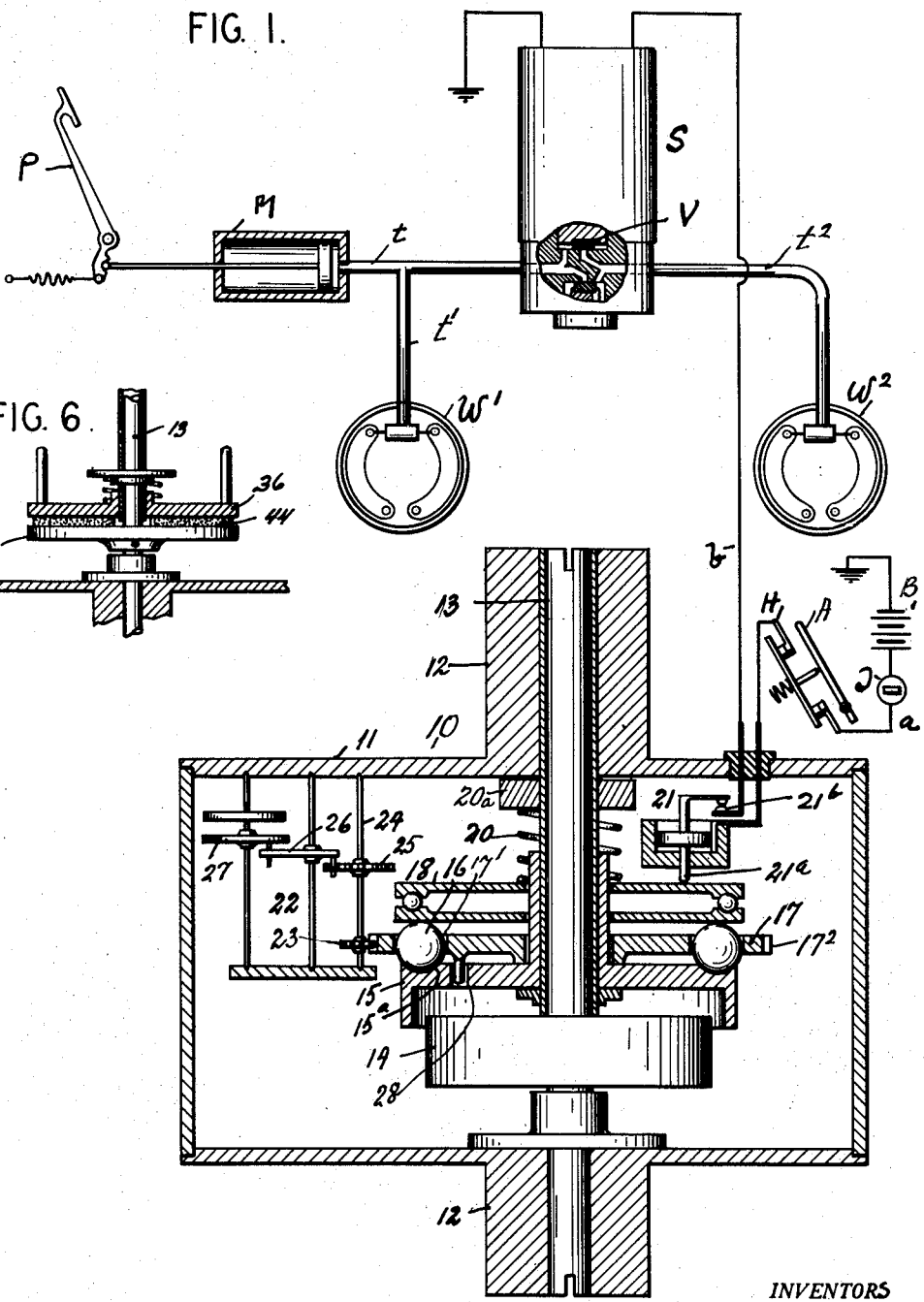
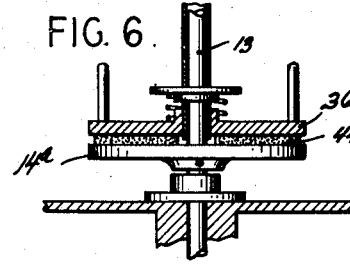
INVENTORS
Joseph Weiss and Abraham Weiss
BY
ATTORNEY.

Patented July 15, 1952

2,603,731

UNITED STATES PATENT OFFICE 2,603,731

GOVERNOR FOR THE AUTOMATIC CONTROL OF BRAKES OF MOTOR VEHICLES OR THE LIKE

Joseph Weiss and Abraham Weiss, New York, N. Y.; said Abraham Weiss assignor to said Joseph Weiss Application November 27, 1948, Serial No. 62,386

13 Claims. (Cl. 200—153)

This application is a continuation in part of our pending application Ser. #3,736 filed January 22, 1948, now abandoned, pertaining to a brake control system and our present invention relates to an improvement of said system.

The chief object of this invention is to provide a governor that will be capable of effectively operating at minimum force and speed.

Another object is to provide a governor which by suitable control means will be capable of trapping and storing energy, for operating an electric switch or the like, and also the spending of said energy.

Still other objects will appear from the following detailed description of our invention.

In the accompanying drawings which constitute part of this specification and in which similar reference characters denote corresponding parts:

Fig. 1 is a vertical section of one embodiment of our new governor shown in connection with the electric means for controlling the brakes;

Fig. 6 is a sectional elevation of a modification of a slipping coupling.

Figure 2:
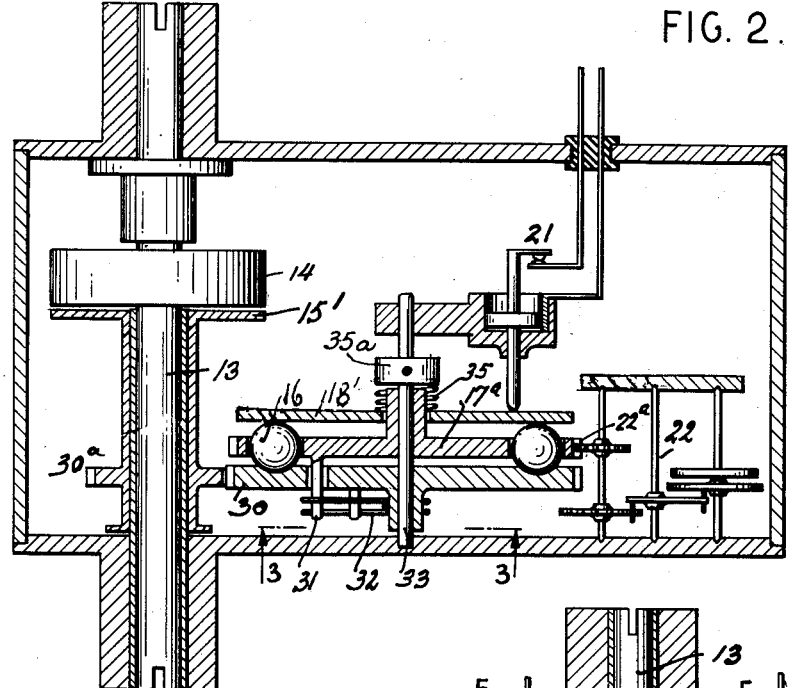
Fig. 2 is a vertical section of another form of construction of the new governor.

In the present example we have shown the new governor used for the control of hydraulic brakes. We do not, however, confine ourselves to brake control, since the governor may be equally effective to control the operation of any apparatus where minimum force and speed is essential.

Referring to the present example and first to the embodiment shown in Fig. 1, the hydraulic brake control system comprises the brake pedal P operatively connected to the plunger of the master fluid cylinder M which through conduits $t$, $t^1$, $t^2$, communicates with the brake fluid cylinders of the wheels, $W^1$, $W^2$ of a motor vehicle (not shown). The conduit $t^2$ leading into the cylinder of wheels $W^2$ is controlled by a valve V adapted to be actuated electrically by means of solenoid S, while the conduit $t^1$ leads directly from the master cylinder M into the fluid cylinder of the driven wheels $W^1$ whose brakes are not affected by the said electric means. B denotes a battery, I an ignition switch, A the accelerator pedal and H an electric switch adapted to be closed when the accelerator is released, as in the position shown, and to be opened when the said accelerator is actuated for fuel feeding.

Our new governor 10 is adapted to control a switch of said battery circuit together with the accelerator switch H, so that at minimum speed of the governor, the switch controlled by it will break the battery circuit, thereby deenergizing the solenoid S and releasing the brakes. Our new governor comprises a frame or housing 11 formed with bearings 12 at diametrically opposite ends in which is rotatively borne a shaft 13, which may be suitably coupled to any suitable driven part of the vehicle, such as the speedometer (not shown). Fixed on said shaft 13 may be a permanent magnet 14, in whose magnetic field is mounted its armature 15, rotatively supported on the shaft 13, and adapted to be impelled therefrom. On its outer face said armature is formed with two or more ramps or tapered recesses or sockets 15a which serve as cams and which movably bear balls 16. These balls project outwardly from the deep end of said cams and through circular holes 17¹ provided in a circular guide plate 17, somewhat axially spaced from said armature. Adapted to constantly bear directly on the outwardly projecting ends of the balls 16 is an element 18 mounted on said shaft so as to be displaceable axially thereon. In the present embodiment this element is shown to comprise a pair of parallelly disposed circular ball bearing disks. The element 18 is adapted to be held in close contact with the balls 16 by a suitable spring 20, so that, when displaced axially, as will be presently explained, it will actuate an electric switch 21 which together with switch H controls the electric circuit through the solenoid S.

The guide plate 17 is suitably geared to an energy trapping or storing and spending mechanism, such as an escapement 22, of any conventional or suitable construction. To this end, the periphery of the guide plate 17 is toothed as at 17² and adapted to mesh with a pinion 23 fixed on a rotary spindle 24 bearing the ratchet 25, pawl 26 and balance wheel 27 of the escapement.

The guide plate 17 has a pin connection 28 with the armature 15. This pin connection 28 is optional and not necessary to the function of the device, serving only as an auxiliary means to limit the amount of travel between guide plate 17 and cam plate 15.

The rotation of the shaft 13 will be transmitted to the armature 15 which through balls 16 will drive the guide plate 17. When the speed of rotation of the shaft exceeds the escapement limited speed of the guide plate 17, the balls 16 borne by the armature will be caused to move through the openings of the guide plate 17 against the element 18 displacing the latter axially. The switch 21 comprises a movable contact member 21a, which by spring (not shown) is held in contact with a stationary contact 21b, so that when said movable contact member 21a is displaced from its normal position, it will open the switch 21.

The mode of operation of our brake control system is as follows:

When the vehicle is brought to a standstill, on the depression of the brake pedal P and the release of the accelerator A, the switches H and 21 are closed, so that the battery circuit along line a, closed switch H, closed switch 21, line b through the solenoid S will be closed, energizing the latter and thereby closing the valve V, thereby trapping the fluid in the brake cylinders of the wheels $W^2$, and locking the brakes.

If it is desired to unlock the brakes, without depressing the accelerator, in order to prevent skidding over icy or muddy roads, the brake pedal P may be moved to release the brakes on wheel $W^1$. This will permit the vehicle to move either forward or in the reverse. By such motion the shaft 13 will begin to rotate and with it the magnet 14. Now, if the torque load on guide plate 17 has been adjusted through means of spring 20 and escapement 22 to permit the synchronized movement of guide plate 17 with cam plate 15 to a certain low speed, say only 2 R. P. M., then if the speed of the shaft exceeds that speed, the guide plate 17 will cause the balls to axially displace the element 18 which in its turn will move the contact member 21a and cause the opening of switch 21, thereby disenergizing the solenoid S. Axial movement of balls 16 can be limited by means of a suitable stop, such as collar 20a.

When the speed of the shaft falls below 2 R. P. M. or when the shaft stops, the guide plate 17 is caused to return to neutral position by spring 20.

Figure 3:
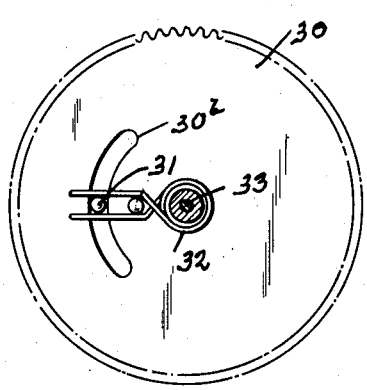
Fig. 3 is a cross section on lines 3—3 of Fig. 2.

In Figs. 2 and 3, the armature $15^1$ which is magnetically actuated to be in frictional engagement with magnet 14 is geared as at 30a to an auxiliary plate 30 rotatively mounted on a spindle 33 and bearing the balls 16 which project through openings in the guide plate 17a. The latter is provided with a pin 31 projecting through an arcuate slot 30b of said auxiliary plate 30 and actuated by a spring 32. The guide plate 17a is also rotatively mounted on the spindle 33 and axially spaced therefrom is an element $18^1$ rotatively and slidably mounted on spindle 33 in close contact with the balls 16 by spring 35. In this modification the guide plate 17a is geared to the escapement 22 at 22a. The element $18^1$ is adapted to actuate the switch 21 in the same manner as in Fig. 1. Pin 31, slot 30b and spring 32 are optional and not necessary to the function of the device. The spring 35 can be utilized (similarly to spring 20 in Fig. 1) to provide the necessary action to return balls 16 to their neutral position. The spring (not shown) of the switch 21 may also be utilized to return balls 16, and in this instance spring 35 may also be dispensed with as superfluous. Axial movement of balls 16 can be limited through adjustable collar 35a.

Figure 4:
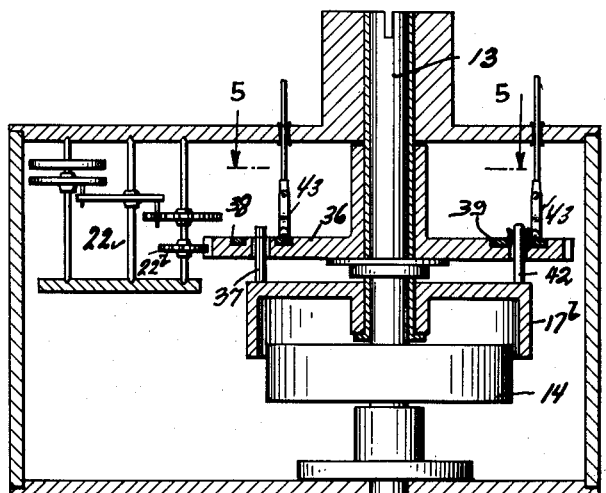
Fig. 4 is a similar section to Figs. 1 and 2 of still another form of construction of our governor, Fig. 5 a cross section on line 5—5 of Fig. 4.
Figure 5:
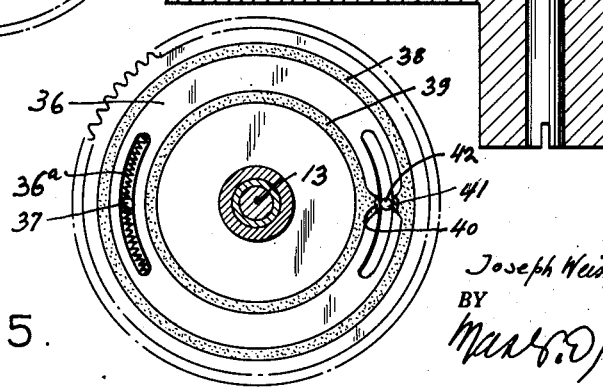

In the modifications shown in Figures 4 and 5, the armature 17b has a resilient connection with a plate 36 spaced therefrom axially and rotatively mounted on the driven shaft 13. This connection comprises a spring urged pin 37, projecting into a concentric slot 36a of the plate 36. Provided on the outer face of said plate 36 are two insulated concentric electric conductors, 38, 39, between which at some suitable point are provided resilient contact points 40, 41. Associated with the armature 17b of the magnet is a contact member, 42, which projects into the space between said pair of conductors and adapted when said plate 36 is in its normal position to conductively connect said pair of conductors, so that brushes 43 in contact with the latter will close the circuit. The plate 36 is geared to the escapement 22 at 22b in a similar manner as in Fig. 1.

When the auxiliary plate 36 is rotated by the armature 17b to the extent limited by said escapement the contact member 42 will be moved out of its normal switch closing position (shown), thereby opening the electric circuit controlled by it.

The structures as depicted employ drives permitting slip when the torque load is in excess of its predetermined and set rated capacity. This prevents excess overspeeding and overloading of the escapement and permits operation of the governor, without damaging effect, when the speed of the drive is to be much greater than that for which the governor is set to operate.

The governor may be modified in various ways. Thus, instead of magnetic affected transmission means of motion from the shaft to the escapement controlled means, any suitable coupling may be used, such as fluid drive, spring-actuated friction drive and/or differential coupling. These are all well known and commonly used types of drives. Thus, in Fig. 6 the part 14a may be a disk fixed on the shaft 13 which through suitable means, such as a disk of Bakelite 44, or the like, has a frictional engagement with the plate 36, shown in Fig. 4 or the armature shown in Fig. 1 or that of the magnetically and frictionally engaged armature shown in Fig. 2.

The governor may also be operated by direct drive or coupling, where the speed of the driving shaft does not cause a too excessive strain or load upon the control means.

The governor shown is adapted to operate in any direction of rotation of the shaft 13. When it is desired to have the governor operate in one direction only, a suitable reversing gear (not shown) may be employed between said shaft and the driving part of the vehicle.

What we claim is:

1. A governor for controlling a movable element of a device, comprising a driven rotary member, a second member in close proximity to said driven member and capable of receiving motion therefrom, means associated with said second member and adapted to limit the speed of said second member to a predetermined rotation and means responsive to said second member when the latter reaches said predetermined rotation to actuate said movable element.

2. A governor for controlling a switch of an electric circuit, comprising a driven rotary member, a second member in close proximity to said driven member and capable of receiving motion therefrom, means associated with said second member and adapted to limit the speed of said second member to a predetermined rotation and means responsive to said second member when the latter reaches said predetermined rotation to actuate said switch.

3. A governor for controlling a movable element of a device, comprising a driven member, a second member adapted to be impelled magnetically from said first member, means associated with said second member and adapted to limit the speed of the latter to a predetermined rotation, and means responsive to said second member when the latter reaches said predetermined rotation to actuate said movable element.

4. A governor according to claim 1 in which the means for limiting the speed of said second member includes an escapement.

5. A governor for controlling a switch of an electric circuit, comprising a driven rotary body, a rotary member in frictional engagement with said body, an element operatively connected to said member, means for limiting the speed imparted to said member to a predetermined rotation, by said body, and means responsive to said member when the latter reaches said predetermined rotation to actuate said electric switch.

6. A governor according to claim 5, in which said element is axially displaceable relative to said member.

7. In a motor vehicle, a governor and a switch actuated by said governor, said governor comprising driven rotary means, a member in close proximity to said driven means and adapted to receive motion therefrom, an element operatively connected to said member, means for limiting the speed of said member to a predetermined rotation and means responsive to said member when the latter reaches said predetermined rotation to actuate said switch.

8. A governor according to claim 5 in which said switch comprises a pair of concentric insulated electric conductors in said element and means associated with said rotary member adapted to normally close contact between said conductors and to open the same when moved away from its normal position.

9. A governor according to claim 5 in which means are provided to cause said element to be displaced axially relative to said rotary member, when the speed of said rotary body tends to exceed that of said rotary member.

10. A governor for controlling a movable element of a device comprising a driven member, a second member capable of receiving motion from said driven member, means including an escapement associated with said second member and adapted to affect said motion and means affected by said affected motion to actuate said movable element.

11. A coupling capable of transferring rotary motion into that of axial motion and also capable of transferring axial motion into rotary motion, comprising a magnet fixed on a shaft, an armature rotatively supported on said shaft within the field of said magnet and adapted to be impelled therefrom, a member having ramps on a face thereof, said member being driven by said armature, balls movably borne in said ramps, a guide plate having holes through which said balls pass, an element displaceable axially relative to said member and bearing directly on said balls and means for maintaining close contact between said balls and said element.

12. A coupling capable of transferring rotary motion into that of axial motion and also capable of transferring axial motion into rotary motion, comprising a magnet fixed on a shaft, an armature rotatively supported on said shaft within the field of said magnet and adapted to be impelled therefrom, a member having ramps on a face thereof, said member being driven by said armature, balls movably borne in said ramps, a guide plate having holes through which said balls pass, an element displaceable axially relative to said member and bearing directly on said balls and spring means for maintaining close contact between said balls and said element.

13. A coupling capable of transferring rotary motion into that of axial motion and also capable of transferring axial motion into rotary motion comprising a magnet fixed on a shaft, an armature rotatably supported on said shaft within the field of said magnet and adapted to be impelled by the magnet, a member having cam surfaces, said member being driven by said armature, balls movably borne on said cam surfaces, an element displaceable axially relative to said member and bearing directly on said balls and means for maintaining close contact between said balls and said element.

JOSEPH WEISS.
ABRAHAM WEISS.

REFERENCES CITED

The following references are of record in the file of this patent:

UNITED STATES PATENTS

| Number | Name | Date |
|---|---|---|
| 277,179 | Weston | May 8, 1883 |
| 2,004,909 | Benson | June 11, 1935 |
| 2,119,247 | Scott | May 31, 1938 |
| 2,187,207 | McCabe | Jan. 16, 1940 |
| 2,235,412 | Weiss | Mar. 18, 1941 |
| 2,243,655 | Scott | May 27, 1941 |
| 2,308,822 | Murphy | Jan. 19, 1943 |
| 2,313,412 | Goepfrich | Mar. 9, 1943 |